United States Patent
Dailey et al.

(10) Patent No.: US 10,448,007 B2
(45) Date of Patent: Oct. 15, 2019

(54) DISCOVERY AND IDENTIFICATION OF LAYER 2 COAX PROBLEMS IN MOCA NETWORKS

(71) Applicant: Spirent Communications, Inc., Sunnyvale, CA (US)

(72) Inventors: David Dailey, Boyds, MD (US); Douglas Grinkemeyer, Germantown, MD (US)

(73) Assignee: Spirent Communications, Inc., San Jose, CA (US)

( * ) Notice: Subject to any disclaimer, the term of this patent is extended or adjusted under 35 U.S.C. 154(b) by 33 days.

(21) Appl. No.: 14/810,898

(22) Filed: Jul. 28, 2015

(65) Prior Publication Data

US 2017/0034506 A1 Feb. 2, 2017

(51) Int. Cl.
*H04N 17/00* (2006.01)
*H04L 12/26* (2006.01)
(Continued)

(52) U.S. Cl.
CPC ....... *H04N 17/004* (2013.01); *H04L 12/2801* (2013.01); *H04L 12/2809* (2013.01);
(Continued)

(58) Field of Classification Search
CPC ............ H04L 12/2697; H04L 12/2801; H04L 41/0659; H04L 41/0677; H04L 43/0811; H04L 43/0817; H04L 43/50; H04L 43/16; H04L 1/0002; H04L 43/0888; H04L 12/2898; H04L 63/08; H04L 12/2809; H04L 12/2838; H04L 41/12; H04L 43/065; H04L 43/0829; H04L 43/10; H04L 61/103; H04L 61/6022; H04L 2012/2849; H04N 21/6473; H04N 21/43615; H04N 21/43637; H04N 21/4367; H04N 17/004; H04N 21/44227; H04W 24/00; H04W 74/00; H04W 36/30; H04W 88/08;
(Continued)

(56) References Cited

U.S. PATENT DOCUMENTS 4,484,218 A * 11/1984 Boland .............. H04N 7/17354
348/E7.075
6,889,255 B1 * 5/2005 DeLuca .............. G06F 11/3495
709/201
(Continued)

OTHER PUBLICATIONS

Monk, A., et al., "The Multimedia Over Coax Alliance," Proceedings of the IEEE, San Diego, CA, Copyright 2013, 17 pages.
(Continued)

*Primary Examiner* — John R Schnurr
(74) *Attorney, Agent, or Firm* — Haynes Beffel & Wolfeld LLP; Ernest J. Beffel, Jr.

(57) ABSTRACT

The operation of testing device for troubleshooting failures in a MoCA LAN system is disclosed that discovers devices on a MoCA LAN. These automatically discovered devices are then sent a large number of data packets that elicit a response from the recipient. The packets transmitted for which no corresponding response is received are counted as lost packets, and the packet loss results for each tested device enables identifying the source of a failure in the network.

19 Claims, 9 Drawing Sheets

(51) Int. Cl.
H04L 12/24 (2006.01)
H04L 12/28 (2006.01)
H04L 29/12 (2006.01)

(52) U.S. Cl.
CPC ...... H04L 12/2838 (2013.01); H04L 41/0677 (2013.01); H04L 41/12 (2013.01); H04L 43/065 (2013.01); H04L 43/0829 (2013.01); H04L 43/10 (2013.01); H04L 43/16 (2013.01); H04L 61/103 (2013.01); H04L 61/6022 (2013.01); *H04L 2012/2849* (2013.01)

(58) Field of Classification Search
CPC ............. G06F 11/0766; G06F 11/1048; G06F 13/4226; G06F 2009/45591
See application file for complete search history.

(56) References Cited

U.S. PATENT DOCUMENTS

| | | | | |
|---|---|---|---|---|
| 7,433,925 | B1* | 10/2008 | Shankar | H04L 12/66 709/202 |
| 8,179,838 | B2* | 5/2012 | Tang | H04L 45/125 370/328 |
| 8,767,688 | B2* | 7/2014 | Qian | H04L 41/0823 370/338 |
| 9,191,282 | B2* | 11/2015 | Kakadia | H04L 41/5009 |
| 10,033,618 | B1* | 7/2018 | Grinkemeyer | H04L 43/08 |
| 2002/0010854 | A1* | 1/2002 | Ogura | H04N 1/00888 713/100 |
| 2009/0031185 | A1* | 1/2009 | Xhafa | H04L 1/0013 714/751 |
| 2009/0147719 | A1* | 6/2009 | Kang | H04L 12/189 370/312 |
| 2010/0299713 | A1* | 11/2010 | Salinger | H04N 17/004 725/106 |
| 2010/0312889 | A1* | 12/2010 | Mori | A63F 13/12 709/224 |
| 2011/0001833 | A1* | 1/2011 | Grinkemeyer | H04H 20/12 348/192 |
| 2011/0149720 | A1* | 6/2011 | Phuah | H04L 12/2697 370/216 |
| 2012/0078994 | A1* | 3/2012 | Jackowski | H04L 47/19 709/202 |
| 2012/0239794 | A1* | 9/2012 | Klein | H04L 45/12 709/223 |
| 2013/0117442 | A1* | 5/2013 | Mountain | H04N 21/45 709/224 |
| 2013/0191570 | A1* | 7/2013 | Lee | H04N 21/43615 710/106 |
| 2013/0198361 | A1* | 8/2013 | Matsuzaki | H04L 41/50 709/223 |
| 2013/0343467 | A1* | 12/2013 | Sogani | G06T 7/0002 375/240.25 |
| 2014/0105036 | A1* | 4/2014 | Anschutz | H04L 41/5019 370/252 |
| 2014/0130111 | A1* | 5/2014 | Nulty | H04N 17/004 725/107 |
| 2014/0254392 | A1* | 9/2014 | Wolcott | H04W 24/08 370/242 |
| 2014/0359389 | A1* | 12/2014 | Seastrom | H04N 21/23608 714/751 |
| 2015/0029869 | A1* | 1/2015 | Wolcott | H04B 3/487 370/242 |
| 2015/0058691 | A1* | 2/2015 | Olgaard | H04W 24/06 714/734 |
| 2015/0063133 | A1* | 3/2015 | Olgaard | H04W 24/08 370/252 |

OTHER PUBLICATIONS

"MoCA Installation and Troubleshooting Reference Guide," Cisco Systems Inc., Lawrenceville, GA, Copyright Aug. 2012, 26 pages.
Ansley, C., MoCA Troubleshooting Experiencs, Recommendations for Efficient Installations, Suwanee, GA, Retrieved online: <http://www.arrisi.com/dig_lib/white_papers/_docs/MoCA_Troubleshooting.pdf.>, accessed Jan. 20, 2015, 17 pages.
"MoCA Networking FAQ and Troubleshooting," TiVo Inc., Copyright 2013, Retrieved online: <http://support.tivo.com/app/answers/detail/a_id/2412>, accessed Jan. 20, 2015, 3 pages.
"CPE WAN Management Protocol v1.1—TR-069," Broadband Forum, Technical Report, Version 1 Amendment 2, Version Date of Dec. 2007, 138 pages.

* cited by examiner

Discovery

Packet Loss

Configuring thresholds

DISCOVERY AND IDENTIFICATION OF LAYER 2 COAX PROBLEMS IN MOCA NETWORKS

BACKGROUND OF THE INVENTION

This application relates to testing of small networks. In particular, the technology described is useful for testing a coaxial-cabled network running a protocol such as MoCA.

Many service providers compete to deliver video to the home or business. As home networks become more prevalent and consumers/small businesses tend to have some kind of network in place, providers take on responsibility for delivery of services across customer-provided networks. Multimedia over Coax Alliance (MoCA) is an industry standard for enabling whole-home distribution of high definition video and content over existing in-home coaxial cabling. Service providers need diagnostic tools to troubleshoot failures in video delivery to a television, video monitor, or set-top box.

There are several challenges of troubleshooting video delivery in a MoCA network. One challenge of troubleshooting video delivery is servicing multiple set-top boxes and other devices in the local network. Another challenge is that coaxial cable can be degraded by the addition of splitters and devices that cause interference. Current instrumentation, such as a digital voltage ohm meter, an RF tester, an optical loss meter, or even a spectrum analyzer have proven inadequate for the task. These tools are not designed to analyze traffic or bandwidth in a local area network. Nor can these tools test actual IP video service, such as shared digital video recorders.

An opportunity arises to introduce improved testing devices and protocols. Testing technologies with easy-to-read output may reduce the burden of training field technicians and reduce the time needed to find and fix a problem with video delivery to the end device.

BRIEF SUMMARY OF THE INVENTION

The operation of a testing device for troubleshooting failures in a MoCA LAN system is disclosed that discovers IP addresses of devices on a MoCA LAN. These automatically discovered devices are then sent a large number of data packets that each elicit a response from the recipient. The packets transmitted for which no corresponding response is received are counted as lost packets, and the packet loss results for each tested device enables identifying the source of a failure in the network.

BRIEF DESCRIPTION OF THE DRAWINGS

MoCA technology may be used in a home to enable the secure and reliable delivery of data, Internet access and standard/HD video around the home. MoCA technology runs over the existing in-home, coaxial cabling and can be used as a transport to extend wireless connectivity. MoCA technology is in use by pay TV operators such as cable, satellite, IPTV, and telephone companies. High speed IP-based multimedia may be sent to devices such as a computer, set-top box, or television over the cable. Data is passed to devices on a MoCA LAN that exists on a home coax network. In some cases there is a MoCA WAN to a customer router which then passes data to devices onto the home MoCA LAN.

DETAILED DESCRIPTION OF THE INVENTION

Figure 1:
FIG. 1 is picture of a pixelated image seen on a television.

The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

FIG. 1 is picture of a pixelated image seen on a television. High speed digital video delivered to a television is sent using a real-time protocol, where there is no time to detect missing packets and resend. The loss of even 1 packet in 50,000 can create a viewer-noticeable glitch on the screen. When a customer experiences a failure such as this on the network, it may be difficult to isolate and correct the problem. Observable failures may be intermittent and difficult to reproduce.

In a MoCA network, unlike with Ethernet, failures are most likely due to a fault in the physical cable layout within the home. That is, failures are more likely to be attributed to a bad cable, a bad connection, a faulty splitter, excessive cable length, or too many cable segments. The usual way of troubleshooting a failure on a MoCA network is to use tools that characterize the physical cable directly. For example, a digital voltage ohm meter, an RF tester, or even a spectrum analyzer may be used to determine whether a particular cable or cable connection is bad. Attenuation may be caused by excessive cable length or cascading of splitters on a single path.

Probe testing is used in Ethernet LAN's to isolate problems such as configuration problems such as networking configuration errors. As mentioned before, the physical Ethernet itself is unlikely to be the cause of a service failure. IP-based testing is used to diagnose failures at these high levels of the networking stack. The technology disclosed herein relies on probe testing for the purpose of diagnosing the physical cable infrastructure. It is different from prior MoCA troubleshooting techniques in the cable layout is not directly measured. In fact, it is not necessary to directly access every cable connector in the home in order to perform the test. The disclosed technology is also different from Ethernet testing because it is the physical network that is being diagnosed, not software configuration of the network.

Figure 2:
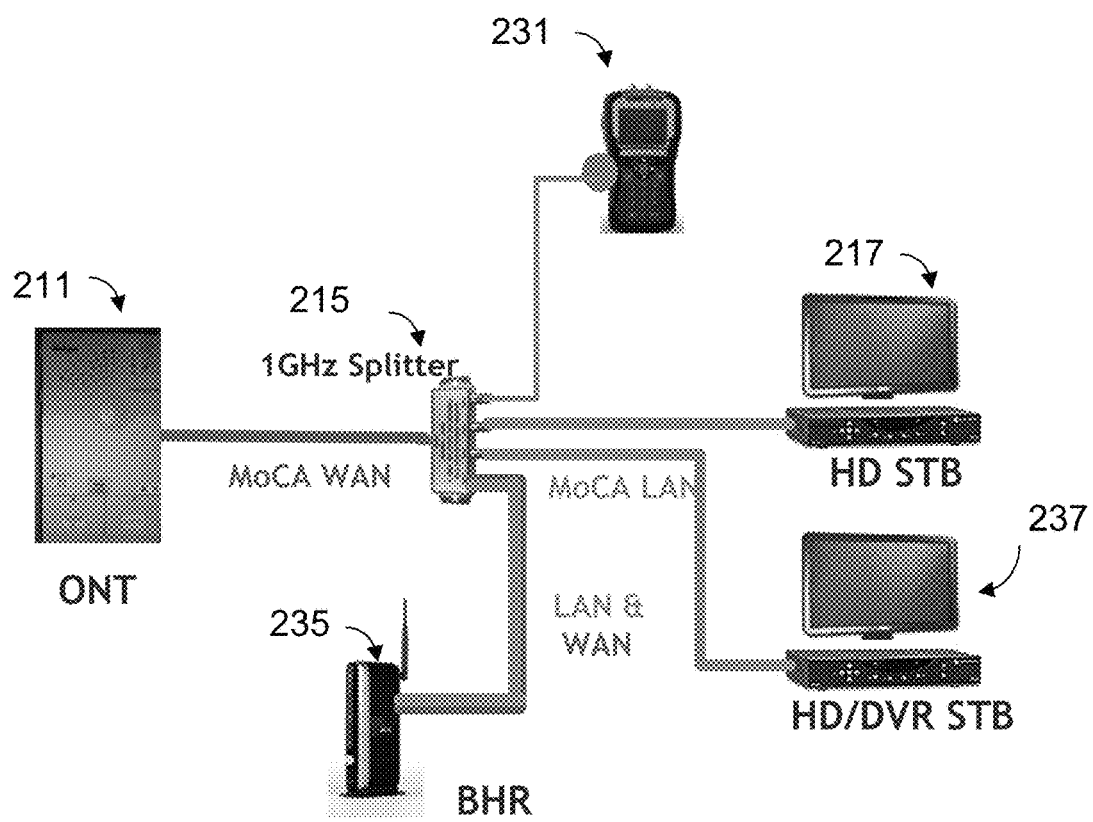
FIG. 2 is a block diagram of an example MoCA network including both a MoCA WAN and a MoCA LAN, with a test device connecting to directly into MoCA network, according to an implementation of the invention.

FIG. 2 is a block diagram of an example MoCA network including both a MoCA WAN and a MoCA LAN, with a test device connecting directly into MoCA network. The network comprises an Optical Network Terminal (ONT) 211 that connects a fiber optic cable carrying broadband to the home with the MoCA wide area network (WAN). The illustrated network includes a Broadband Home Router (BHR) 235 that connects the MoCA WAN with the MoCA local area network (LAN) within the home. A high definition (HD) set top box (STB) 217 and a HD digital video recorder STB 237 are also on the MoCA LAN. When a device is plugged into the MoCA network, the device listens for a beacon on a particular frequency to discover the location of a network controller. The network controller allocates time slots for the newly joined device to send and receive data to/from each other device on the network. Each time slot is reserved for traffic from one particular device to another particular device (i.e. one way point-to-point traffic). In particular, when the test device 231 joins the MoCA network, the network controller creates a schedule for the test device to communicate with the BHR.

As can be seen in FIG. 2, there are multiple potential failure spots. Individual ports on Splitter 215 could fail or connections may be loose, the connection between the coax and the device may be loose, a cable may be defective, or a long coaxial cable length may cause signal attenuation resulting in less bandwidth.

Figure 3:
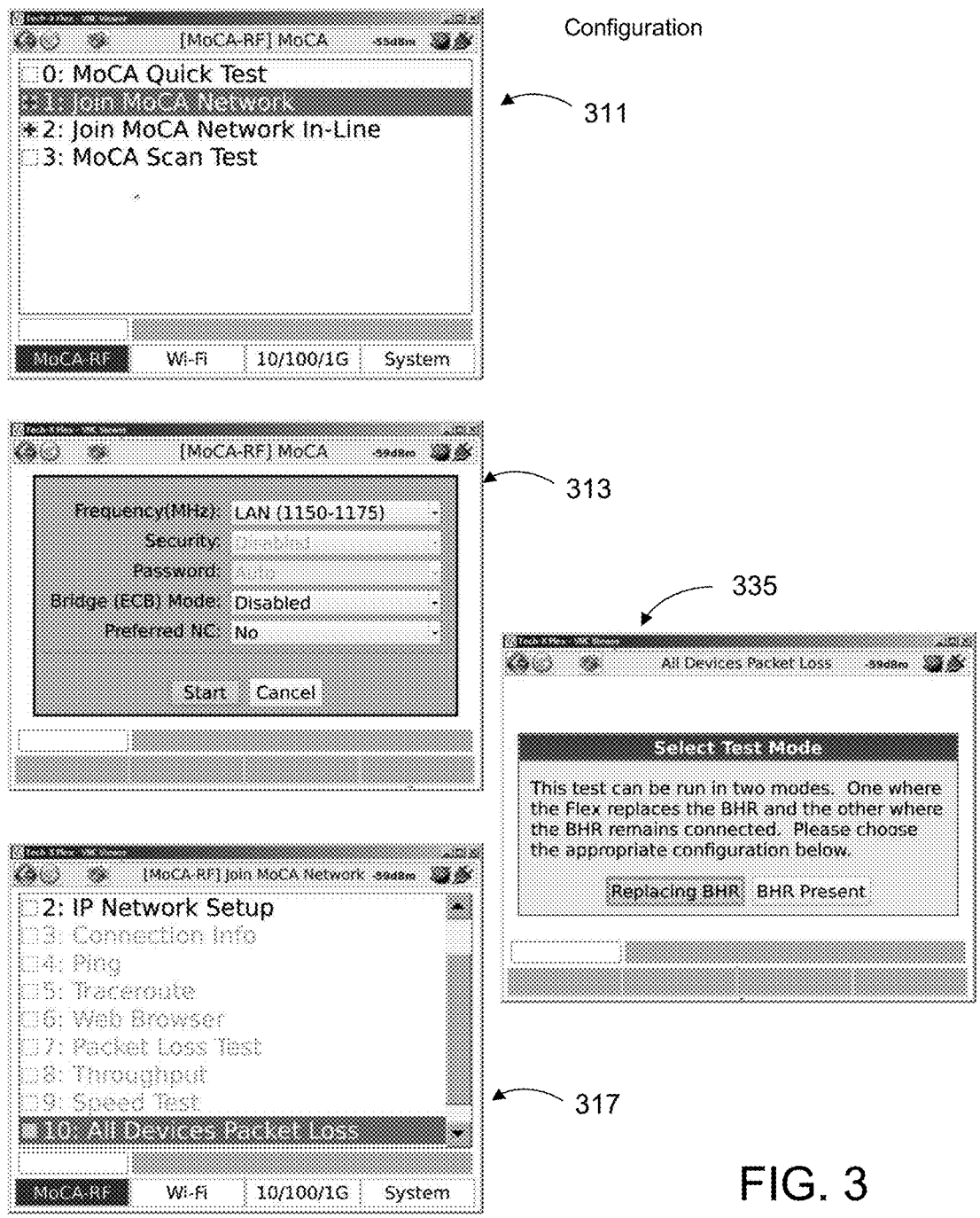
FIG. 3 illustrates an example user interface for configuring a test device to troubleshoot a problem on a MoCA LAN, according to an implementation of the invention.

FIG. 3 illustrates an example user interface for configuring a test device to troubleshoot a problem on a MoCA LAN, according to an implementation of the invention. The test device may include a display, and the user interface may be provided directly on the test device display. Alternatively, the test device may be communicatively coupled with a test device controller that provides a display for the user interface, and user commands may be sent to the testing device and results may be received from the testing device for display to the user.

In an implementation, the test device joins the MoCA Network as seen in 311 (MoCA-RF option is selected at the bottom of the screen). Screen 313 illustrates selecting a frequency band for the test device on the MoCA network. In screen 317 menu item 10: All Devices Packet Loss is selected. In this implementation, the BHR 235 continues to participate in the MoCA network and will be a target for test packets from test device 231. The IP addresses of the devices on the MoCA LAN are discovered. In an implementation, the range of IP addresses used by each vendor of network devices is configured into the test device, or delivered to the test device upon request. A ping packet (also referred to herein as a probe or a probe packet) is sent to every IP address within the configured address ranges. Returning acknowledgement packets identify the IP address assigned to a device. The acknowledgement packet includes the MAC address of the responding device. The MAC address may be used to determine which devices are on the MoCA network and to filter out IP addresses for devices not on the MoCA network. The MAC addresses on the MoCA network are known to the testing device. At the end of the discovery process, the test device has constructed a list of IP addresses of every (minimally functional and reachable) device on the MoCA LAN.

Figure 4:
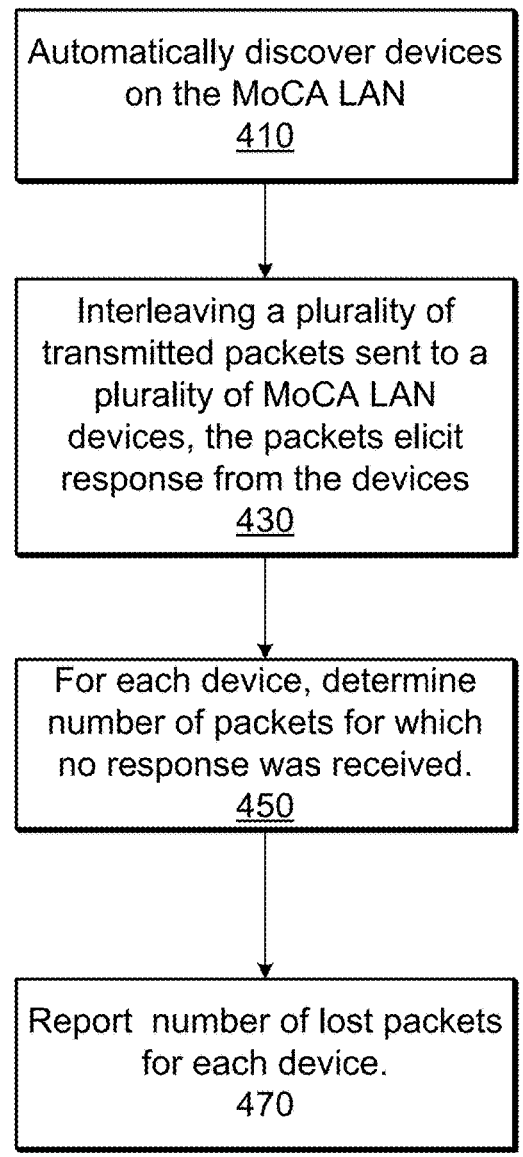
FIG. 4 illustrates a flow chart showing a process for determining packet loss, according to an implementation of the invention.

FIG. 4 illustrates a flow chart showing a process for determining packet loss, according to an implementation of the invention. At 410, the test device automatically discovers the other devices on the MoCA LAN, which in this example includes HD STB 217, HD/DVR STB 237, and BHR 235. At 430, test packets are sent directly to each of the discovered devices on their respective channel. The transmission of packets attempts to simulate the transmission of IP video traffic, so a very large number of test packets are sent in rapid succession to each device. In an implementation, multiple devices being tested may receive and respond to probe packets concurrently and the probe packets transmitted asynchronously and interleaved in time. For example, a probe packet may be sent to one device before and after sending a probe packet to different device. Thus, the devices may not be tested serially. Unlike with Ethernet, using dedicated point-to-point channels for each transmission avoids interference between one packet and another.

The packets sent to each device implement a protocol in which the receiving device responds to the test packet. An example of such a protocol is ICMP echo, where a "ping" is sent to a device and a response is expected back. A failure is assumed when no response is received back. Ping may be used to identify a path that includes an unresponsive device, broken cable, and/or loose connection.

The technique disclosed herein is different from an administrator or network operator determining the availability of a device. An administrator may use probe packets to verify that a particular device is up and reachable. Usually, knowing that a different device is up and reachable is not helpful in performing the diagnosis. However, because of the coax cable network topology, test results for multiple devices may be useful for isolating a portion of the cable or connections that are failing. For example, if the cable segment between the splitter and the home router is the only failing component, the test device would observe packet loss for the router, but no packet loss for any of the other devices. Another distinction between a network operator/administrator using ping for diagnosing a network and the technique described herein is that troubleshooting IP video streaming requires sending a large number of very fast packets sent over the network, which is generally not needed when diagnosing IP connectivity problems.

At 450, the number of packets sent for which no corresponding response was received, may be totaled and compared to the number of packets that were sent to the device. A packet loss rate is determined. At 470 packet loss information for each MoCA device may be reported to the user. The absolute number of packets transmitted and received may be reported, and/or a proportion of failed or successful packets may be reported.

Figure 5:
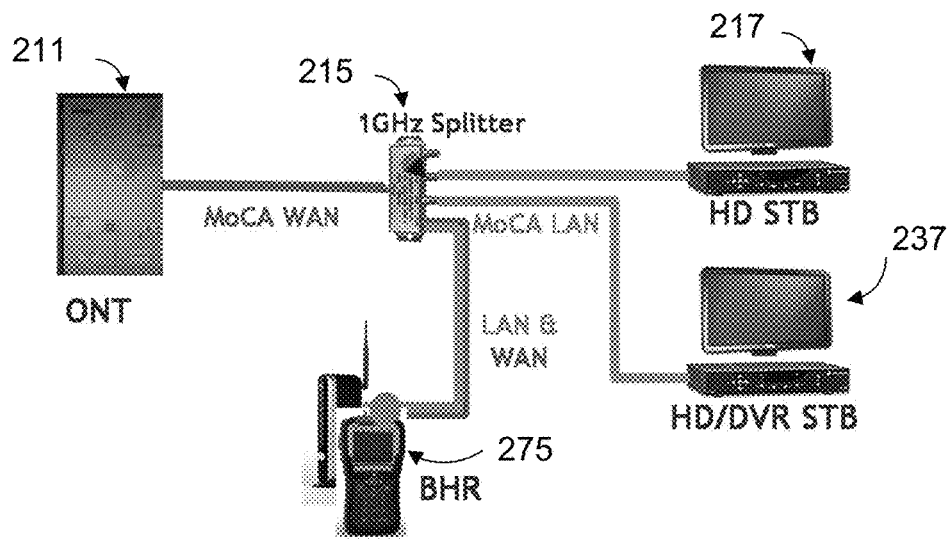
FIG. 5 is a block diagram of MoCA network with test device connecting directly into MoCA network, replacing BHR, according to an implementation of the invention.

In a different implementation, the test device having additional functionality may replace the BHR. FIG. 5 is a block diagram of a MoCA network with the test device 275 connecting directly into MoCA network and replacing the BHR, according to an implementation of the invention. 275 is a MoCA device with combined router and testing functionality. Building device 275 may be realized in a variety of ways. The test device, in addition to discovering devices on the network and probing the devices, may be adapted to perform the functions of the BHR, and the test device may replace the BHR temporarily during the test. For example, the BHR responds to DHCP requests to assign an IP address to a device on the network. Once the test device assembles the list of active IP address as normal procedure in preparation for testing, the test device can use that list for allocating new IP addresses in response to DHCP requests while the router is disconnected. The screen shown in 335 illustrates configuring the test device 275 to replace the BHR.

In an alternative implementation, the test device probing functionality may be added into the BHR 235 device so that the testing capability is always available. The BHR already maintains the active IP addresses on the MoCA network, so no additional discovery is needed for the purpose of testing. Having the testing capability built into the router may obviate the need for a repair person to come on site into the home to gather the packet loss information.

Figure 6:
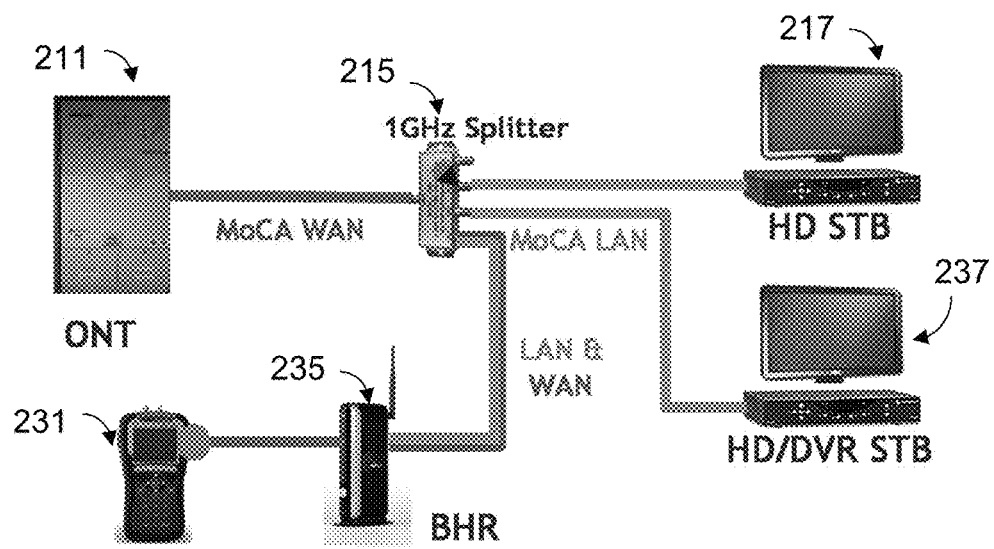
FIG. 6 is a block diagram of MoCA network with test device connecting to BHR over Ethernet, according to an implementation of the invention.

FIG. 6 is a block diagram of a MoCA network with the test device connecting to BHR over Ethernet, according to an implementation of the invention. In this configuration, no changes are made to the MoCA network. The test device does not join the MoCA network and need not have a MoCA interface. Instead, test device 231 connects to the BHR 235 over an Ethernet LAN. (Though not shown in the figure, screen 311 would have the 10/100/1G option selected). The test device 231 is able to discover the IP devices through the BHR and send IP traffic to those devices through the BHR. The response messages are received through the BHR by the test device over the Ethernet connection.

Figure 7:
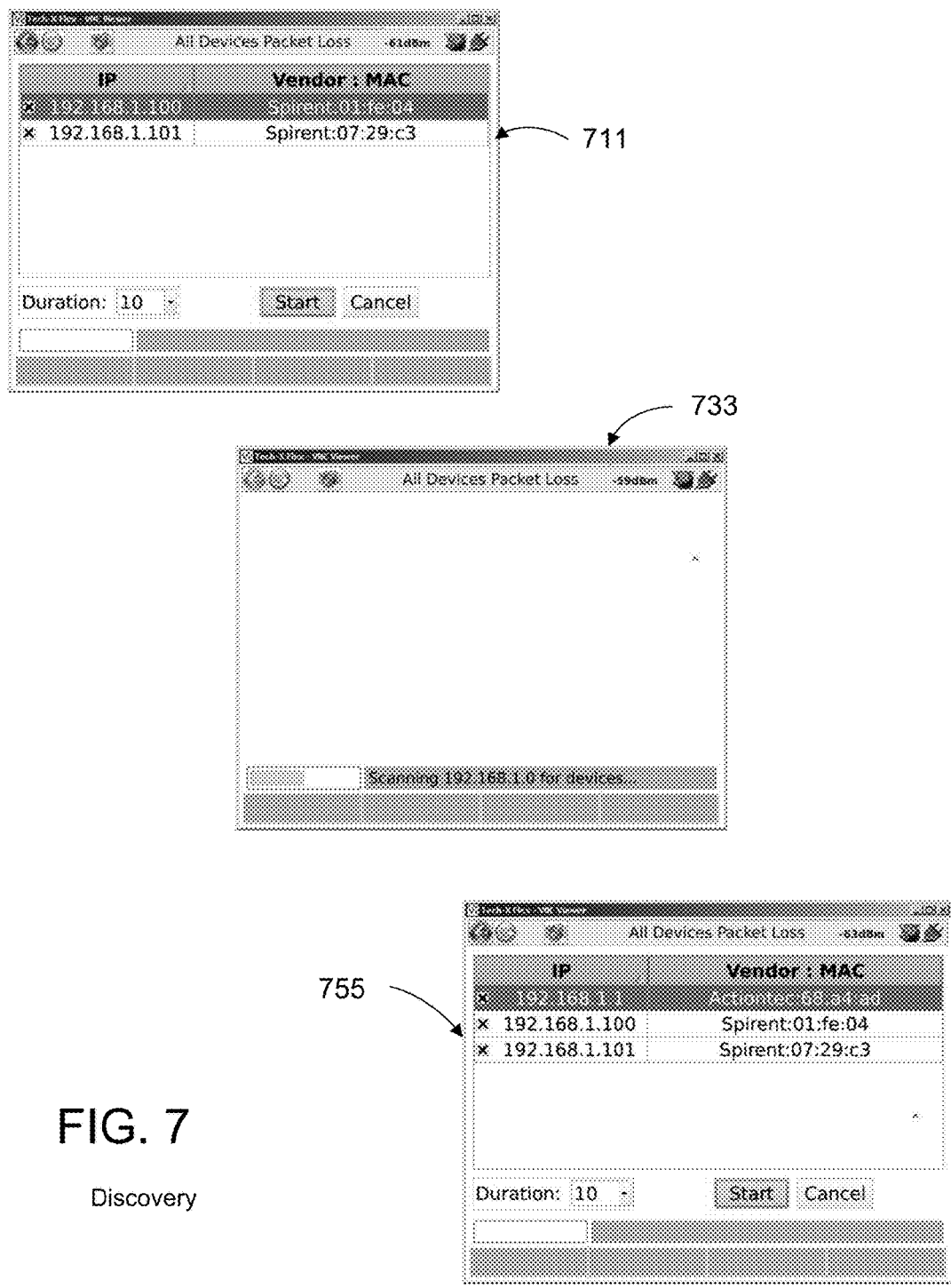
FIG. 7 illustrates an example user interface for performing the "all devices packet loss" test on the MoCA network, according to an implementation of the invention.

FIG. 7 illustrates an example user interface for performing the "all devices packet loss" test on the MoCA network, according to an implementation of the invention. In screen 711, a discovery process is conducted. In this example, two devices have been discovered at IP addresses 192.168.1.100 and 192.168.1.101. Screen 733 illustrates continuing to search for IP devices on the network. Screen 755 illustrates that a third device is discovered at IP address 192.168.1.1. Actiontec manufacturers routers, so MAC address 68:a4:ad might correspond to the home router. Once the devices are discovered, pressing the "start" button on screen 755 starts the packet loss test. Probe packets are generated and sent to each IP address in the discovered list.

Figure 8:
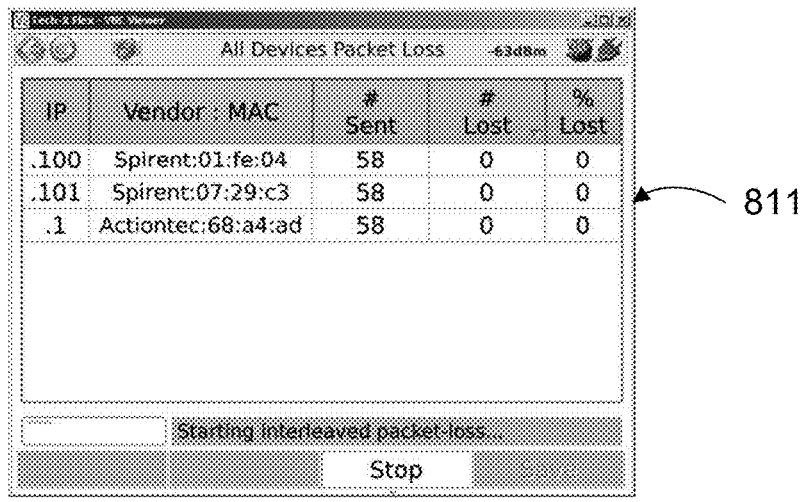
FIG. 8 shows example screen shots for viewing detailed test results for each device being tested, according to an implementation of the invention.
Figure 8:
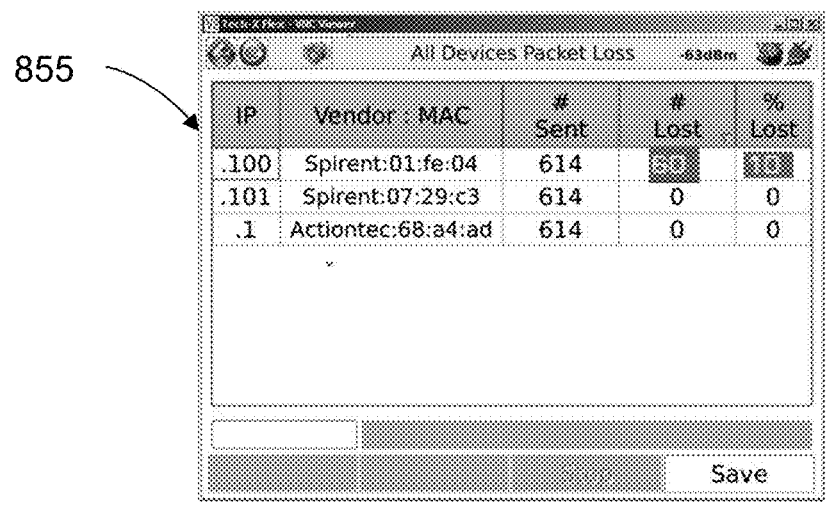

FIG. 8 shows example screen shots for viewing detailed test results for each device being tested. Screen 811 shows the status after 58 test packets have been sent each of the devices. In this example, no packets were lost, and thus the percentage of packets lost is also zero. Screen 855 shows that the operator stopped the test after sending 614 packets, and the device at address 01:fe:04 lost 60 packets amounting to 10% of packets lost.

Figure 9:
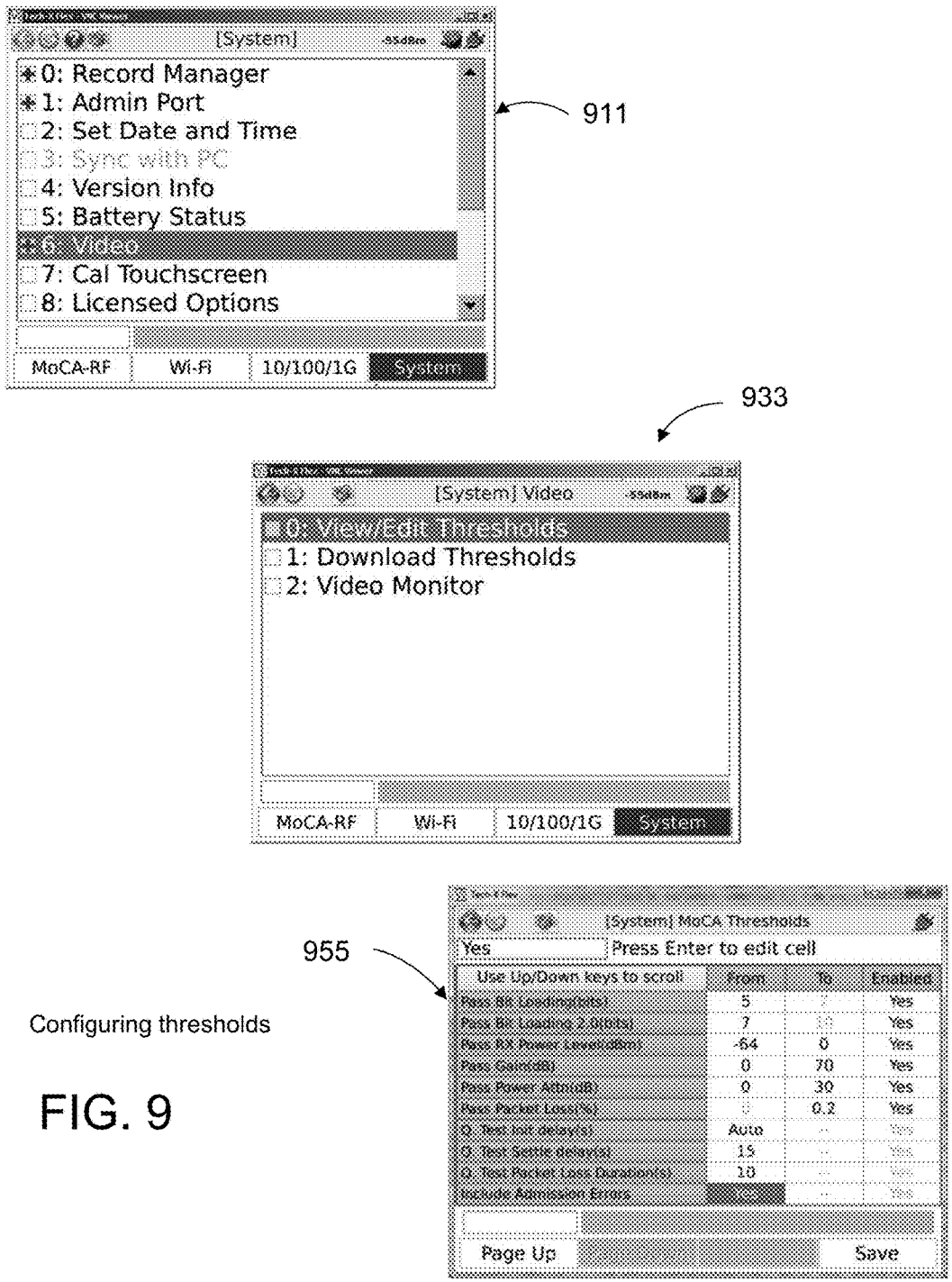
FIG. 9 illustrates an example user interface for configuring packet loss thresholds, according to an implementation of the invention.

FIG. 9 illustrates an example user interface for configuring packet loss thresholds, according to an implementation of the invention. Screen 911 shows configuration options. In this example, options for video testing are selected. Screen 933 shows selecting to view and edit packet loss thresholds. The packet loss thresholds may be used to determine a status of all devices on the MoCA LAN based on the absolute number or proportion of packets lost. The test status may be determined by comparing the number or proportion of lost packets to a user-configured threshold that may be specified through a user interface. Example screen 955 shows configuring a packet loss threshold of 0.2%. If 0.2% of the transmitted packets to a device are lost, the test status for the device will be indicated as failed.

Figure 10:
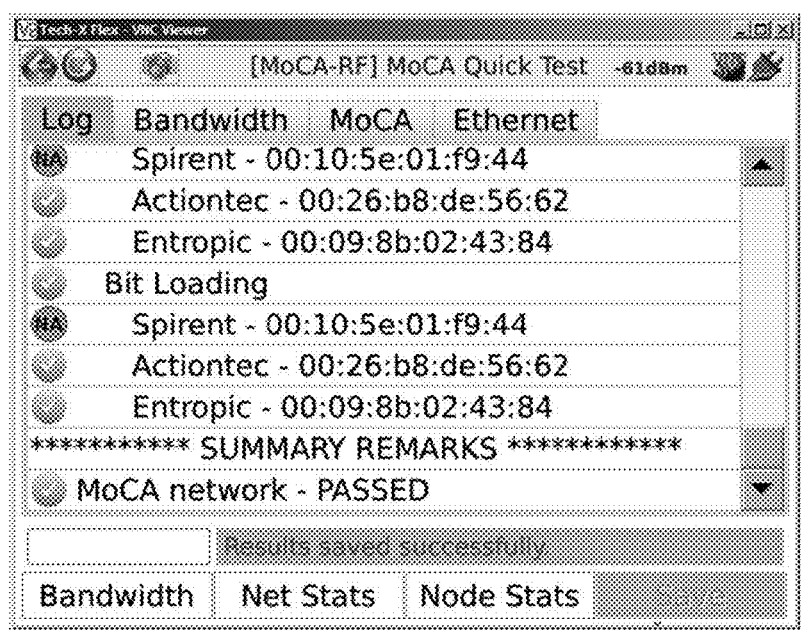
FIG. 10 is an example screenshot of a quick test results summary, according to an implementation of the invention.

FIG. 10 is an example screenshot of a quick test results summary. Above the summary remarks, there is one status line for each device being tested. The green check mark indicates that the packet loss if any was in an acceptable range below configured thresholds and the device passed the test.

Some Particular Implementations

In one implementation, a method for troubleshooting a pixelated video image transmitted over a Multimedia over Coax Alliance (MoCA) LAN is described from the perspective of a probing device. The method includes automatically iterating over a plurality of MoCA devices discovered on the MoCA LAN and transmitting packets to each of the discovered devices. The packets require a response from each of the devices. Packets are transmitted to the devices concurrently such that first and second packets are transmitted to a first device and a third packet is transmitted to a second device in between transmission of the first and second packet. The disclosed method includes detecting a number of lost packets that did not receive a required response from at least one packet-dropping device among the plurality of MoCA devices and reporting identities of one or more packet-dropping devices that have packet loss rates exceeding a preconfigured threshold.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

The probing device may join the MoCA LAN by establishing point-to-point communication channels with other devices on a MoCA network that includes a home router that couples the MoCA LAN in communication with a WAN. The probing device may discover IP devices on the MoCA LAN by sending probe packets to IP addresses within a configured range of addresses and receiving a response to each probe packet that includes an IP address and the MAC address of each device. The list of discovered IP devices may be filtered based on the MAC address of each device in the list so that only IP addresses of devices having a MAC address known to be on the MoCA LAN remain on the list. A discovered device may be a set-top box, a digital video recorder (DVR) set-top box, or a television.

In an alternative implementation, the probe device replaces the home router in the network, assuming its role by receiving DHCP requests and responding to the DHCP requests by sending an available IP address in the network.

In another implementation, a test controller device may connect to a separate probing device and causing the probing device to perform the automatically iterating, transmitting packets, and detecting lost packets actions. In addition, the test controller device may receive packet loss data from the probing device detecting the number of lost packets. The test controller may report identities of one or more packet-dropping devices.

The test controller device may connect to the probing device over an Ethernet physical port, and packets may be transmitted over an Ethernet connection through a broadband home router (BHR) on the MoCA LAN. The test controller device may receive from the probing device addresses of MoCA devices on the MoCA network.

In an implementation, at least 10,000 packets may be transmitted over the MoCA LAN to each of the plurality of discovered devices. A predetermined threshold for packet loss may be configured by a user before packets are transmitted. The packet loss may be determined as a proportion of the number of packets sent. The identity of and packet loss rate for each of the plurality of discovered devices may be reported.

Other implementations may include a probing device that includes a processor, network interface, and storage device storing instructions for performing variations of the disclosed method.

Another implementation is a test controller device that includes a processor, network interface, and storage device storing instructions for connecting to a probing device and causing the probing device to perform automatically iterating over discovered devices, transmitting packets, and detecting lost packets, receiving from the probing device packet loss data from detecting the number of lost packets, and reporting identities of one or more packet-dropping devices.

Yet other implementations include a non-transitory computer readable storage medium storing instructions executable by a processor to perform any of the methods described above.

We claim as follows:

1. A method for troubleshooting a pixelated video image transmitted over an in-home coaxial RF network compliant with a standard promulgated by Multimedia over Coax Alliance (coax LAN), the method comprising:
   from a probing device, automatically transmitting a plurality of packets to each of a plurality of coax LAN devices discovered on the coax LAN;
   transmitting packets from the probing device iteratively to each of the plurality of coax LAN devices each packet requiring a response from the respective receiving coax LAN device, wherein:
     a first packet and a second packet are transmitted to a first device;
     a third packet is transmitted to a second device, and
     the third packet is transmitted to the second device after the first packet is transmitted to the first device and before the second packet is transmitted to the first device;
   detecting a number of lost packets that did not receive a required response from at least one packet-dropping device among the plurality of coax LAN devices;
   reporting identities of the at least one packet-dropping device that has a packet loss rate exceeding a predetermined threshold.

2. The method of claim 1, further comprising:
   the probing device joining the coax LAN by establishing point-to-point communication channels with other devices on the coax LAN network, the coax LAN network including a home router that couples the coax LAN in communication with a WAN;
   discovering IP devices on the coax LAN by sending probe packets to IP addresses within a configured range of addresses;
   creating a list of devices, each device in the list of devices returning a response to a received probe packet, the response including an IP address and the MAC address of said each device; and
   filtering the list of devices based on the MAC address of said each device in the list.

3. The method of claim 2, further comprising:
   the probing device assuming a role of a home router by receiving DHCP requests and responding to the DHCP requests by sending an available IP address in the network.

4. The method of claim 1, further comprising:
   a test controller device connecting to the probing device and causing the probing device to perform the automatically iterating, transmitting packets, and detecting lost packets actions;
   the test controller receiving from the probing device packet loss data from detecting the number of lost packets; and
   the test controller reporting identities of the at least one packet-dropping device.

5. The method of claim 4, wherein the test controller device connects to the probing device over an Ethernet physical port.

6. The method of claim 4, wherein the packets are transmitted over an Ethernet connection through a broadband home router (BHR) on the coax LAN.

7. The method of claim 4, wherein the test controller device receives from the probing device addresses of coax LAN devices on the coax LAN network.

8. The method of claim 1, further comprising reporting the identity of the plurality of discovered devices.

9. The method of claim 1, further comprising reporting a packet loss rate corresponding to each of the plurality of discovered devices.

10. The method of claim 1, wherein at least 10,000 packets are transmitted over the coax LAN to each of the plurality of discovered devices.

11. The method of claim 1, wherein the predetermined threshold for packet loss for each device is a proportion of the number of packets sent.

12. The method of claim 1, wherein the predetermined threshold for packet loss is configured by a user before the packets are transmitted.

13. The method of claim 1, wherein a discovered device of the plurality of discovered devices is one of a group comprising at least a set-top box, a digital video recorder (DVR) set-top box, and a television.

14. A probing device comprising:
   a processor;
   a network interface; and
   a storage device storing instructions, which when executed by the processor, cause the processor to perform the method of claim 1.

15. The probing device of claim 14, wherein the network interface is a coax LAN network interface.

16. A non-transitory computer-readable storage medium storing instructions which when executed by a processor cause the processor to perform the method of claim 1.

17. A test controller device comprising:
   a processor;
   a network interface; and
   a storage device storing instructions, which when executed by the processor, cause the processor to:
     connect to a probing device and cause the probing device to perform:
       transmitting packets to each of a plurality of devices connected to an in-home coaxial RF network compliant with a standard promulgated by Multimedia over Coax Alliance (coax LAN devices), the packets requiring a response from the coax LAN devices; and
       detecting a number of lost packets that did not receive a required response from at least one packet-dropping device among the plurality of coax LAN devices;
     receive from the probing device packet loss data from detecting the number of lost packets; and
     report identities of the at least one packet-dropping device.

18. The test controller device of claim 17, wherein the network interface is an Ethernet network interface.

19. A method for troubleshooting a pixelated video image transmitted over an in-home coaxial RF network (coax LAN), the method comprising:
- from a probing device, automatically iterating over a plurality of coax LAN devices discovered on the coax LAN;
- transmitting packets from the probing device to each of the plurality of coax LAN devices, the packets requiring a response from the discovered devices, wherein:
- a first packet and a second packet are transmitted to a first device;
- a third packet is transmitted to a second device, and
- the third packet is transmitted to the second device after the first packet is transmitted to the first device and before the second packet is transmitted to the first device;
- detecting a number of lost packets that did not receive a required response from at least one packet-dropping device among the plurality of coax LAN devices;
- reporting identities of the at least one packet-dropping device that has a packet loss rate exceeding a predetermined threshold.

\* \* \* \* \*